Patented July 20, 1948

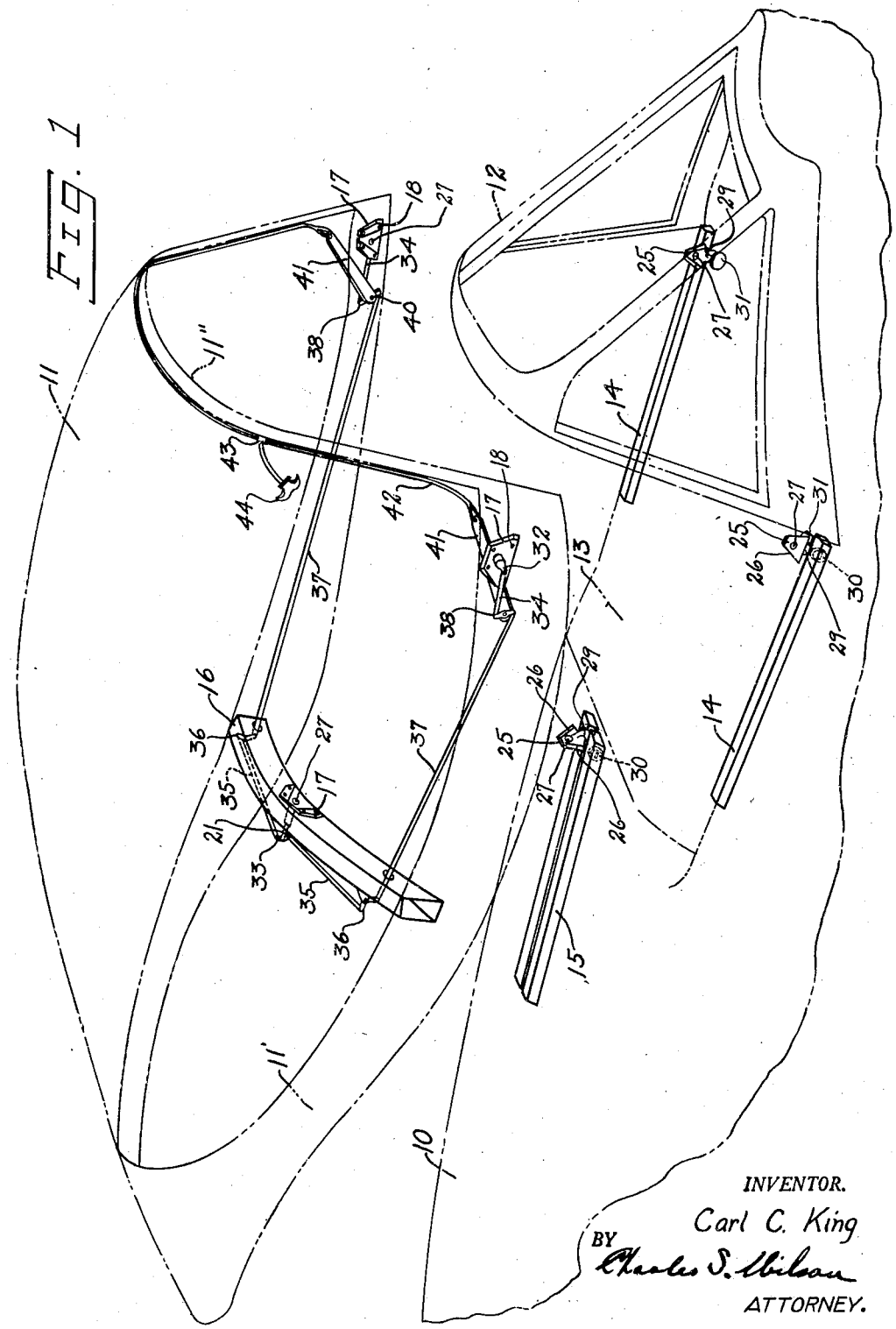

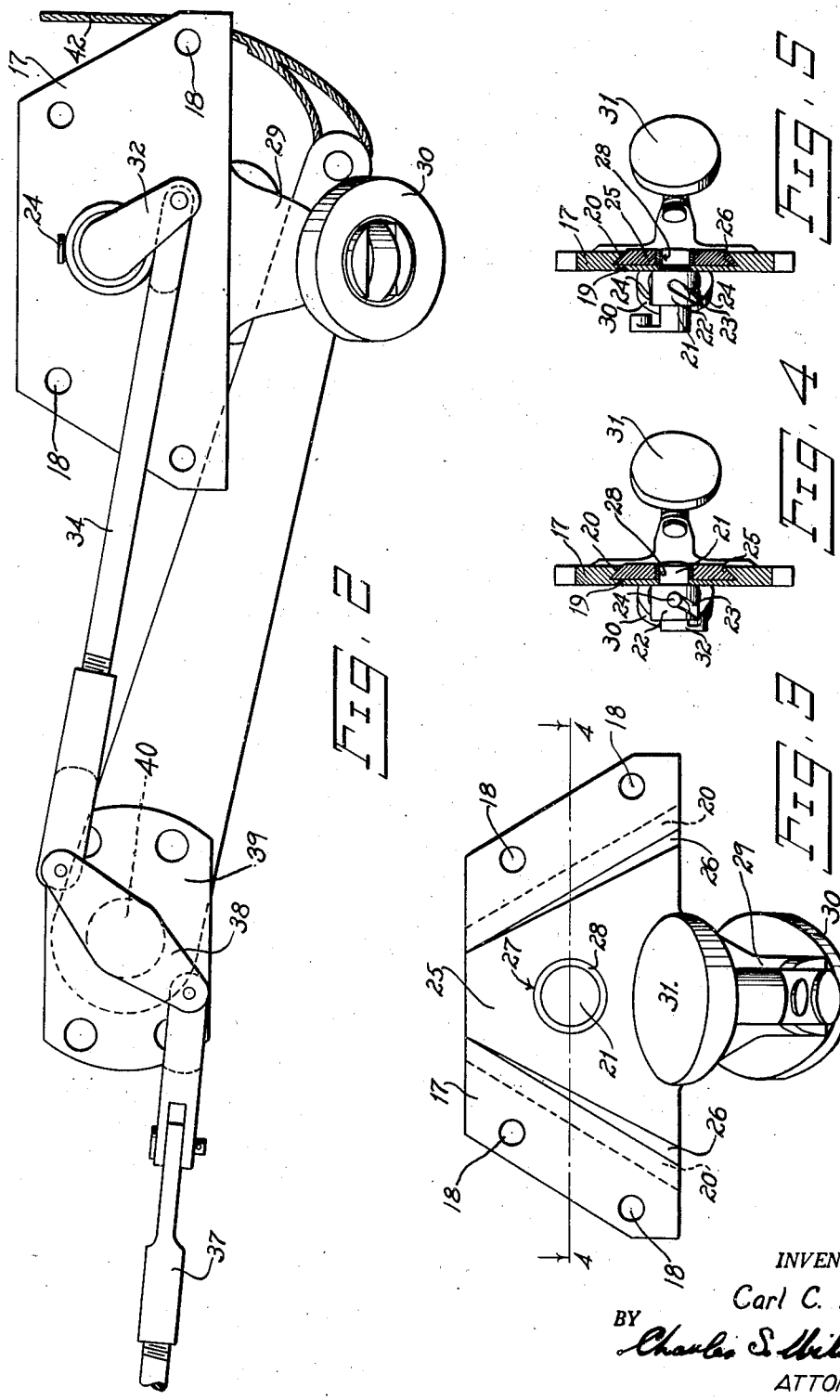

2,445,438

UNITED STATES PATENT OFFICE 2,445,438

CANOPY MOUNTING AND RELEASING MECHANISM

Carl C. King, Massapequa, N. Y., assignor to Republic Aviation Corporation, near Farmingdale, N. Y., a corporation of Delaware Application September 14, 1944, Serial No. 554,050

14 Claims. (Cl. 244—121)

1

This invention relates generally to aircraft canopies and in particular proposes means by which the canopy may be mounted on the fuselage, either fixedly or for reciprocation, and which includes a releasing mechanism whereby the canopy may be instantly and entirely freed from any cooperation with or attachment to the fuselage.

With the above and other objects in view, as will be apparent, this invention consists in the construction, combination and arrangement of parts all as hereinafter more fully described, claimed and illustrated in the accompanying drawings, wherein:

Fig. 1 is an exploded schematic view showing a fuselage and coacting canopy in phantom lines and illustrating the components of the present maintaining and releasing mechanism in full lines:

Fig. 2 is an elevation of one of the components of the mounting and releasing mechanism employed at the forward end of a reciprocable canopy viewed inwardly of the cockpit immediately adjoining the inner face of the canopy apron or frame and showing it in conjunction with the control by which the mounting and releasing mechanism employed at the aft end of the canopy is operable from and simultaneously with that at the forward end of the canopy:

Fig. 3 is an elevation from the interior of the cockpit, with parts omitted, of one of the mounting and releasing mechanisms by which the forward end of the canopy is secured to the fuselage:

Fig. 4 is a horizontal section taken along line 4—4 of Fig. 3 to illustrate the coaction between the components of the mounting and releasing mechanism and the means whereby they are locked in cooperative engagement: and Fig. 5 is an identical view illustrating the same components released from locking cooperation for ultimate separation in the release of the canopy from the fuselage.

The present invention contemplates the mounting of an aircraft canopy, regardless of its construction and shape, for reciprocating movement upon and longitudinally of a fuselage and to that end provides a plurality of canopy supports each comprising a pair of coacting components, one having permanent sliding engagement with the fuselage and the other fixedly attached to the canopy. Under normal operating conditions the components of each support are locked or secured together to function as a unitary mounting element but on occasion may have their locking cooperation broken so that they may be separated. Means for simultaneous control of the locking cooperation of the components of all of the canopy supports is provided, the proper manipulation of which instantaneously releases the entire canopy from all attachment to or cooperation with the fuselage and thereby permits of, or causes, it to be discarded or jettisoned.

Referring to Fig. 1 of the drawings, 10 designates the fuselage of an aircraft and 11 the canopy coacting therewith, both being illustrated in phantom lines. The construction of the canopy and of the fuselage forms no part of the present invention, the latter being applicable to any type of canopy and any type of fuselage. As an example of one use or application of the present invention it is shown and will be described in conjunction with the unitary single piece canopy of the "bubble" type, which is mounted to reciprocate upon the fuselage. Where such a canopy is employed the bottom edge thereof where it joins or rests against the fuselage is provided with an apron or frame 11' of metal or other suitable material.

As a canopy of this general type tapers from its forward end towards its aft end and since it reciprocates upon the fuselage 10, a track 14 is placed upon each longeron extending rearwardly from the frame of the windshield 12. Centrally positioned on the fuselage immediately to the rear of the cockpit 13 is a central track 15 which consists of a pair of opposed tracks, U-shaped in cross-section and combining to comprise, in effect, a single track. The forward tracks 14 support and permit the reciprocation of the forward end of the canopy. For mounting and supporting, as well as the reciprocation, of the aft end of the canopy, a yoke 16 is interposed between and secured to the inner faces of the sides of the frame or apron 11', at a point in the length of the canopy corresponding to the aft end of the cockpit 13 when the forward frame piece 11" secured to and carried by the apron 11' and defining the forward extremity of the canopy abuts the windshield 12. The foregoing structure forms no part of the present invention which coacts with the tracks 14—15, the yoke 16, and the frame or apron 11' for the support and reciprocation of the canopy 11.

A series of socket or mortise plates 17 are secured to and carried by the apron or frame 11' of the canopy 11 and the yoke 16. One of these mortise plates 17 is secured to each side of the frame or apron 11' on the interior of the canopy and immediately adjoining the forward frame piece 11" defining the forward end of the canopy. A third mortise or socket plate 17 is positioned on the forward face of the yoke 16 centrally of its length, i. e., approximately upon the longitudinal axis of the canopy.

Each socket plate comprises a flat plate 17 having a series of apertures 18 adjoining its convergent vertical edges through which screws pass to secure the plate to the supporting structure, to wit: the forward extremities of the frame or apron 11' and the yoke 16. A socket 19 is formed centrally in the inner face of the plate 17, the sides 20 of which are undercut and converge upwardly as illustrated in Figs. 3, 4 and 5. An aperture or bolt hole is centrally formed in the bottom of the socket of the plate 17 for the reception of a bolt 21. On the face of the plate 17 opposed to the socket 19 is provided a bushing 22 the passage of which is in registration with the hole or aperture in the base of the socket. The wall of the bushing 22 is provided with a helical or cam groove 23 through and in which operates a pin 24 fixed to the bolt 21 mounted for oscillation and reciprocation in the passage of the bushing 22. If the bolt 21 is rotated in one direction within the bushing 22 the cooperation between the pin 24 of the slot 23 will project the inner end of the bolt from the bushing through the aperture in the base of the socket 19 so that it will substantially traverse the socket 19. This position of the bolt 21 is illustrated in Fig. 4. A reverse oscillation or rotation of the bolt 21 will, by reason of the cooperation between the pin 24 secured to the bolt and the helical or spiral slot 23, cause the bolt to be retracted from the slot 19 and to be housed almost completely within the bushing 22. This position of the bolt is shown in Fig. 5. All of the socket plates 17 are identical in construction except that the plate mounted on the yoke 16 has a longer bushing 22 than those secured adjacent to the forward extremities of the apron or frame 11'. This is merely to provide for and insure the operation of a longer bolt 21 in connection with this particular socket plate because of the thickness of the yoke 16.

For cooperation with each mortise or socket plate 17 is a tenoned roller bearing plate 25. This tenon plate 25 is provided with the beveled sides 26 which converge upwardly and which are to be received under the undercut sides 20 of the coacting socket or mortise plate 17. The tenon plate 25 is inserted upwardly in the socket 19 of the coacting mortise plate 17 with its beveled edges 26 underlying the sides 20 of the socket 19. Thus there can be no separation or cooperation of the plates 17 and 25 but by sliding relative movement in parallel planes.

Each tenon plate 25 is provided with an aperture 27 lined with a bronze bushing or other suitable bearing 28 and when the tenon plate 25 is completely seated in the socket 19 of its coacting mortise plate 17, the opening 27 and bearing 28 register with the passage of the bushing 22 on the opposite side of the plate 17. Thus when the bolt 21 is moved to traverse the socket 19 of the plate 17 it projects into the opening 27 and its bearing 28 as illustrated in Fig. 4 and locks the two plates 17 and 25 against any relative movement. When the bolt 21 is reversely moved as above described, from the socket 19 and consequently from the bearing 28 of the plate 25, the plates are free to move relatively in parallel planes, so that the plate 17 may travel upwardly to become separated from the plate 25.

The several plates 25 are attached to the fuselage and for that purpose each plate is provided with a bracket 29 at its lower end which in turn carries a roller or rollers 30. These rollers, in that form of the invention shown in the accompanying drawings, are received and for the purposes of this invention permanently mounted in the tracks 14—15. The rollers 30 carried by the tenon plates 25 which coact with the forward socket or mortise plates 17 at the forward end of the canopy 11 operate in the tracks 14 disposed on longerons on each side of the cockpit while tenon plate 25 coacting with the mortise or socket plate 17 secured to the yoke 16 is provided with rollers 30 which operate in the tracks 15 secured centrally to the fuselage. So far as the present invention is concerned, these rollers are to reciprocate in their respective tracks and are permanently attached to the tracks. Thus when all of the bolts 21 are retracted or withdrawn from the apertures 27 of their respective tenon plates 25, the mortise plates 17 are free to become separated from the tenon plates 25 carried by the tracks as aforesaid. In this manner the canopy can be completely released from all engagement with the fuselage.

Should the canopy be a fixed canopy, i. e.: secured against bodily movement or reciprocation to the fuselage, the tenon plates 25 instead of being attached to rollers 30 operating on the tracks 14—15 may be permanently and immovably fixed to the fuselage and when so affixed will cooperate with the mortise or socket plates 17 carried by the canopy as above described. However in that adaptation of the invention here shown and described the canopy is always free to be reciprocated and to that end each of the forward tenon plates 25 is provided with a handle 31 by which the plates 25 and their rollers 30 may be reciprocated on their coacting tracks 14 with the attendant reciprocation of the aft plate 25 and its rollers 30 relative to the tracks 15. By reason of the cooperation between the plates 25 and 17 at the forward end of the canopy 11 this causes the canopy as a whole to move with the plate 25 relative to the tracks 14—15. So long as plates 25 and 17 are locked together by the bolts 21 the canopy 11 is not only fixed to the fuselage 10 but in that form of the invention shown and described herein is free to move relative to the fuselage and the tracks 14—15 carried by the fuselage.

In order to operate all of the bolts 21 in unison to release the locking engagement between the plates 25 and 17, each bolt at the forward end of the canopy is provided with an angularly disposed arm 32 fixed to the extremity of the bolt while the bolt 21 carried by the yoke 16 is provided at its outer extremity with a cross arm 33. Links 34 are pivoted to each angular arm 32 and extend rearwardly of the cockpit 13 adjacent the inner face of the frame or apron 11'. A link 35 is pivoted to each end of the cross arm 33 on the bolt 21 carried by the yoke 16. Each link 35 extends in opposite directions adjacent each face of the yoke. Each link 35 at its outer terminal is pivoted to one arm of a bellcrank lever 36 mounted adjoining an extremity of the yoke 16 and the opposite arm of each bellcrank lever is pivotally connected to a rod 37 extending forwardly of the canopy to a point adjoining the extremity of the corresponding link 34.

A mounting 39 is secured to the frame or apron 11' adjacent the ends of the rod 37 and link 34 on each side of the canopy by means of a shaft 40 and carries a rocker arm 38, the extremities of which are pivoted to the adjacent extremities of the rod 37 and link 34. The shaft 40 of the rocker arm 38 is provided with a lever 41 fixed to the shaft and by which the shaft and rocker may be oscillated.

When the levers 41, one on each side of the forward end of the canopy 11, are swung upwardly the shafts 40 and cross arms 38 are oscillated to exert pulls on the rods 37 and links 34. The links 34 thereupon act on the arms 32 of the forward bolts 21 to retract the latter from engagement with the coacting tenon plates 25. Simultaneously the pulls on the rods 37, swing the bell cranks 36 about their pivots and through them and the links 35 cause the cross arm 33 to rotate the bolt 21 of the mounting on the yoke 16 to release the tenon plate 25 thereof from the coacting socket or mortise plate 17 carried by the yoke 16.

Thus by moving the levers 41 upwardly in unison all of the bolts 21 are moved from the locking position shown in Fig. 4 to the position illustrated in Fig. 5 whereupon the entire canopy is entirely free of an attachment to the fuselage. For the purpose of so moving the levers 41 upwardly in unison the forward frame 11″ of the canopy has a cable 42 threaded through the loops or sleeves 43 carried thereby, which cable is provided with a central handle 44 and has its extremities attached to the ends of the levers 41. A pull on the handle moves it to the position shown in Fig. 1 thereby elevating the extremities of the levers 41 connected to the ends of the cable 42 and oscillating rocker arms 38 thereby simultaneously retracting all of the bolts 21 and freeing the canopy.

Of course when the canopy is jettisoned, or to be released for any reason, which is usually only in an emergency, there is no occasion to operate the levers in a downward direction from the position shown in Fig. 1. However, the placing of the canopy 11 in position on the fuselage for its normal reciprocating movement the tenon plates 25 are inserted in the sockets or mortises 19 of the plates 17 whereupon the levers 41 may be moved downwardly simultaneously to lock all of the plates 25—17 in inter-engagement and positioning the handle 44 adjacent the forward frame piece 11′ of the canopy. The reciprocation of the canopy in no manner interferes with or changes the adjustment or function of the mounting means herein described.

What is claimed is:

1. The combination with a fuselage and canopy, of mortised bracket plates fixed to the canopy, tenon plates on the fuselage, each to be received in the mortise of one of the bracket plates, and means individual to each coacting mortise and tenon to lock them in inter-engagement.

2. The combination with a plate having a cavity therein with convergent, undercut sides, of a second plate having convergent, beveled sides to be received in the cavity of the first plate with its beveled, convergent sides underlying the undercut convergent sides thereof, a bushing on one of said plates and having a cam slot in its wall, a lock bolt mounted for rotation in said bushing and having an outstanding pin for travel in said cam slot, and means for rotating said bolt to move it into and out of locking cooperation with the other of said plates.

3. The combination with a primary plate provided with a cavity in one of its faces having its sides undercut and convergent upwardly and an opening piercing said plate in the base of its cavity, of a spirally slotted bushing registered with said opening and normal to the face of said plate opposed to the said cavity, a bolt mounted for rotation in said bushing, a pin fixed to said bolt to travel in the slot of the bushing upon the rotation of the bolt thereby moving the bolt into and out of the cavity aforesaid, and a secondary plate to be received in the cavity of the first plate having upwardly convergent beveled sides to underlie the sides of said cavity and provided with an opening for the reception of the bolt upon its projection into the cavity of the first plate.

4. The combination with a fuselage and a cooperating canopy, of a series of plates secured to the canopy each having a mortise opening inwardly of the canopy, a rotary bolt carried by each plate, means whereby the rotation of the bolt in one direction projects its extremity into the mortise and the reverse rotation thereof withdraws its extremity from the mortise, a complementary series of tenon plates carried by the fuselage each to be received in the mortise of a companion mortise plate and each having an aperture therein for the reception of the projected extremity of the bolt of said mortised plate, and means for rotating all of said bolts in unison for the simultaneous withdrawal of their extremities from the coacting apertures of the tenon plates.

5. The combination with a fuselage and a cooperating canopy, of a series of plates secured to the canopy each having a mortise opening inwardly of the canopy, a rotary bolt carried by each plate, means whereby the rotation of the bolt in one direction projects its extremity into the mortise and the reverse rotation thereof withdraws its extremity from the mortise, a complementary series of tenon plates carried by the fuselage each to be received in the mortise of a companion plate and each having an aperture therein for the reception of the projected extremity of the bolt carried by the companion plate, an angular arm fixed to the outer extremity of each bolt, an operating member attached to all of said arms, and a single handle for exerting a pull on said member to swing said arms in unison to rotate said bolts in a direction to withdraw the bolt extremities simultaneously from the coacting openings of the tenon plates.

6. The combination with an aircraft canopy, of a forward mounting plate upon each side thereof and an aft mounting plate positioned centrally of the width of the canopy, a bolt carried by each plate and movable to be projected beyond one face of said plate, an operating arm fixed to each bolt, links connecting with the operating arm of the bolt of the aft plate, rods extending longitudinally of the canopy toward the forward plates and connected at their aft ends to said links, an oscillatory rocker arm mounted on each side of the canopy adjoining and connected to the forward extremity of the corresponding rod, a connection between said rocker arm and the operating arm of the bolt of the adjacent forward plate, means for oscillating said rocker arms in unison to thereby operate all of said bolts in unison, and means carried by the fuselage individual to and coacting with each of said mounting plates for attaching the canopy to the fuselage.

7. The combination with an aircraft canopy, of a forward mounting plate upon each side thereof and an aft mounting plate positioned centrally of the width of the canopy, a bolt carried by each plate and movable to be projected beyond one face of said plate, an operating arm fixed to each bolt, links connecting with the operating arm of the bolt of the aft plate, rods extending longitudinally of the canopy toward the forward plates and connected at their aft ends to said links, an oscillatory rocker arm mounted on each side of the canopy adjoining and connected to the forward extremity of the corresponding rod, a connection between said rocker arm and the operating arm of the bolt of the adjacent forward plate, a lever individual to and mounted to oscillate each rocker arm, a control for the operation of said levers in unison, and means carried by the fuselage to cooperate with the mounting plates on the canopy for attaching the latter to the fuselage.

8. The combination with an aircraft canopy having an internal transverse yoke, of a mounting plate affixed centrally to said yoke, a mounting plate on each side of the canopy, a bolt carried by each plate for rotary movement, means whereby the rotation of each bolt causes its axial reciprocation, an operating arm fixed to each bolt on the sides of the canopy, a cross-arm on the extremity of the bolt carried by the yoke, links pivoted to the extremities of said cross arm and extending in opposite directions to terminate adjacent the ends of the yoke, rods pivoted to ends of said links, one adjoining each side of the canopy and terminating adjacent the forward end of the canopy, a rocker arm on each side of the canopy having one end secured to the extremity of the corresponding rod, a link connecting its other end to the adjoining operating arm, a lever to oscillate each rocker arm, means for operating said levers in unison, and mounting means carried by the fuselage for coaction with the mounting plates carried by the canopy to be lockingly engaged by the bolts aforesaid.

9. In an aircraft having a fuselage and a canopy the combination with a series of tracks arranged longitudinally of and secured to the fuselage, of a carrying plate coacting with each track and projecting upwardly within the canopy, rollers on each carrying plate cooperating with the corresponding track and arranged to be normally irremovable from cooperation therewith, a complemental vertical socket plate fixed to the inner side of the canopy for each of said carrying plates to receive said carrying plate and thereby mount the canopy for reciprocating movement on the fuselage, an individual lock associated with each carrying plate and its complemental socket plate to releasably secure them in cooperative relationship, and means for operating each lock in unison to release the carrying plates and permit the movement of the canopy in a direction away from the fuselage.

10. The combination with an aircraft having a fuselage and canopy, of a series of tracks arranged longitudinally of and secured to said fuselage, a vertical plate having convergent sides and mounted on each of said tracks and so associated therewith that all of said vertical plates may reciprocate in unison on said tracks longitudinally of the fuselage, a complemental vertical socket plate fixed to the interior of the canopy for each of said first plates, the sides of the socket thereof being convergent for cooperation with convergent sides of said first plate, and means arranged and associated with each pair of plates to lock them together in cooperation as aforesaid.

11. The combination with an aircraft having a fuselage and canopy, of a series of tracks arranged longitudinally of and secured to said fuselage, a vertical plate having convergent sides and mounted on each of said tracks and so associated therewith that all of said vertical plates may reciprocate in unison on said tracks longitudinally of the fuselage, a complemental vertical socket plate fixed to the interior of the canopy for each of said first plates, the sides of the socket thereof being convergent for cooperation with convergent sides of said first plate, and releasable means individual to each socket plate arranged to lockingly engage the complement plate received therein.

12. The combination with a fuselage and a cooperating canopy, of a connection for securing the canopy to the fuselage comprising a pair of normally parallel plates, one secured to the canopy and the other to the fuselage together with means of sliding interengagement between said plates, and means carried by one of said plates to lockingly secure the other plate against sliding relative movement upon interengagement between the plates as aforesaid.

13. The combination with a fuselage and a cooperating canopy, of a connection for releasably securing the canopy to the fuselage comprising a pair of normally parallel plates one attached to the fuselage and the other to the canopy, and one of said plates having a mortised recess in one of its faces for the sliding reception and engagement of the other plate.

14. The combination with a fuselage and a cooperating canopy, of a connection for releasably securing the canopy to the fuselage comprising a pair of normally parallel plates one attached to the fuselage and the other to the canopy, and one of said plates having a mortised recess in one of its faces for the sliding reception and engagement of the other plate, and a locking member carried by one of said plates for locking engagement of the other plate upon one of said plates being seated in and engaged by the mortised recess of the other plate.

CARL C. KING.

REFERENCES CITED

The following references are of record in the file of this patent:

UNITED STATES PATENTS

| Number | Name | Date |
|---|---|---|
| 550,221 | Euphrat | Nov. 19, 1895 |
| 1,805,014 | Schalk | May 12, 1931 |

FOREIGN PATENTS

| Number | Country | Date |
|---|---|---|
| 472,366 | Great Britain | Sept. 22, 1937 |
| 544,571 | Great Britain | Apr. 17, 1942 |